No. 747,706. PATENTED DEC. 22, 1903.
E. M. HEWLETT.
MAGNETIC CLUTCH.
APPLICATION FILED JUNE 18, 1902.
NO MODEL.
2 SHEETS—SHEET 1.

Witnesses:

Inventor.
Edward M. Hewlett.
by
Atty.

No. 747,706. PATENTED DEC. 22, 1903.
E. M. HEWLETT.
MAGNETIC CLUTCH.
APPLICATION FILED JUNE 18, 1902.
NO MODEL. 2 SHEETS—SHEET 2.

WITNESSES: INVENTOR:
Edward M. Hewlett,
by
Atty.

No. 747,706. Patented December 22, 1903.

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

MAGNETIC CLUTCH.

SPECIFICATION forming part of Letters Patent No. 747,706, dated December 22, 1903.

Application filed June 18, 1902. Serial No. 112,150. (No model.)

*To all whom it may concern:*

Be it known that I, EDWARD M. HEWLETT, a citizen of the United States, residing at Schenectady, county of Schenectady, State of New York, have invented certain new and useful Improvements in Magnetic Clutches, of which the following is a specification.

This invention relates to magnetic clutches. In devices of this kind as commonly constructed a coil moving with the clutch parts is employed to polarize or magnetize the members, necessitating special and complicated provisions for introducing current to the coil-terminals. By the present invention the clutch is formed of three parts, one of which is stationary and carries a coil and the other two of which are mounted within the field of the coil and form a part of the magnetic circuit for the same, shifting into and out of clutching relation without forming a contact with the stationary member of the clutch. The two movable clutch members are preferably formed of iron, and the stationary member on which the coil is mounted is also formed of iron, so that the coil is inclosed within a good magnetic circuit in which a narrow air-gap exists at each side of the stationary member. The jaws of the clutch, where they come into contact, are faced with friction-shoes to afford a good gripping-surface and to provide for renewal. Thus the amount of end play necessary to bring the jaws of the clutch into and out of grip is exceedingly slight. The clutch may be employed for any uses where the transmission of power from one rotating element to another is desired to be discontinuous.

The several features of novelty will be hereinafter more fully described and will be definitely indicated in the appended claims.

Figure 1:
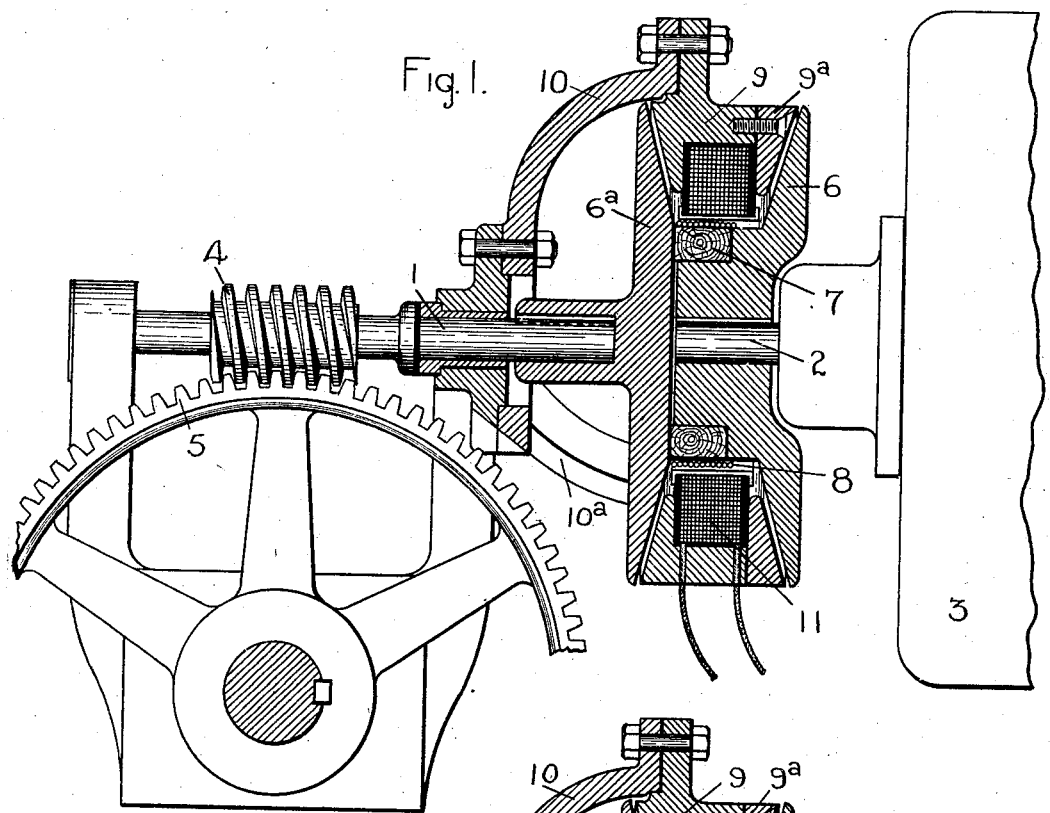
Figure 2:
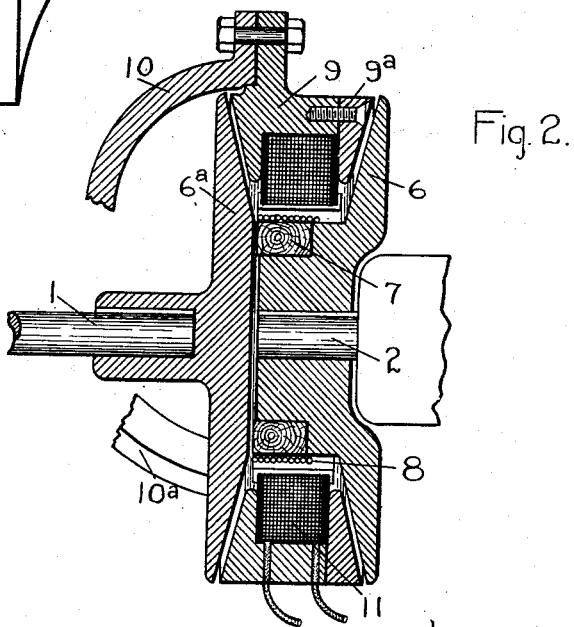

In the accompanying drawings, which illustrate the invention, Figure 1 is a sectional view of a clutch embodying the improvements applied between a rotating armature of an electric machine and a worm-gear driven thereby. Fig. 2 is a similar view of the clutch alone, showing the parts in open relation; and Fig. 3 is a modification, in which the air-gap remains constant between the magnetized clutch members throughout their entire range of movement.

1 and 2 represent the two rotary elements or shafts between which the discontinuous connection is desired. One of these is shown as driven by the armature 3 of an electric motor, though, of course, any other suitable source of power might be applied. The driven member carries, as shown in the drawings, a worm 4, driving a worm-gear 5. It might, however, be connected to any other driven element of a machine. To the shaft 2 is keyed one member 6 of the clutch and to the shaft 1 the companion member $6^a$ of the clutch. These are formed, preferably, of iron, being iron castings, though they need not necessarily be composed entirely of iron, as will presently appear. The hub of the member 6 is provided with a shoulder, on which is placed a range of blocks 7, of maple-wood or other friction material, placed together so as to form a ring and bound in place by a wire winding 8, the ends of which may be soldered fast. The wood overlaps the edge of the clutch member 6 and coöperates with a face of the member $6^a$. As shown in Fig. 1, the two are clutched together, indicating the relation when motion is transmitted from one shaft to the other. In a deep groove formed between the two clutch members is an iron ring 9, bolted fast to a stationary spider 10 $10^a$. This ring carries a magnetizing-coil 11, the ends of which may be brought out, as indicated in the drawings, and carried to any suitable source of current. The ring 9 is recessed to admit the coil and a face-plate $9^a$ applied by lag-screws to anchor the coil in place. The amount of end play necessary to permit the clutch to engage and disengage is exceedingly slight. In fact, for some purposes the force applied to the driven shaft might be varied by a graduation of the current in the coil 11, the two members of the clutch being held together and the friction varied by a varying current strength. This becomes possible by reason of both members of the clutch being at all times disconnected from the stationary member 9, between which and the member at each side is an air-gap which is never closed.

Figure 3:
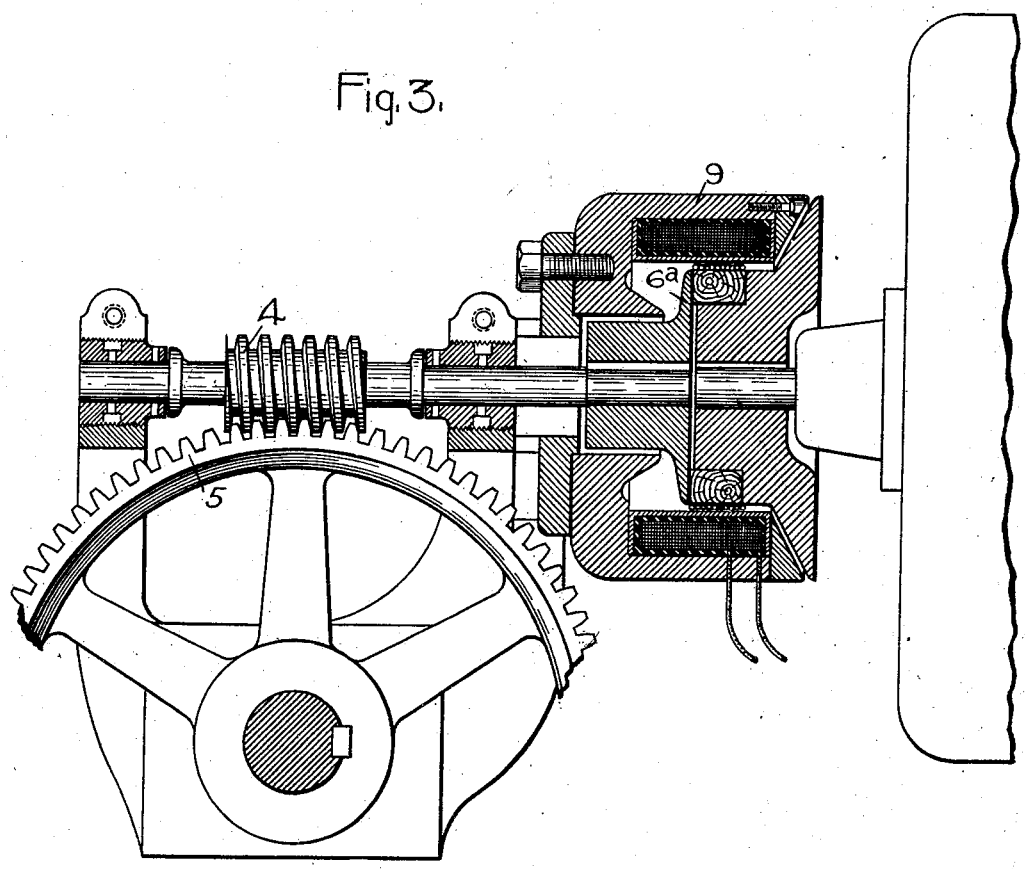

The design shown in Fig. 3 of the drawings is in many cases preferable to that shown in Figs. 1 and 2. The general type of construction is the same, one clutch member being secured to the motor-shaft and the other to the driven shaft; but in this case the air-gap is maintained constant throughout all changes of adjustment or throughout the range of play of the clutch parts. In this case the fixed member of the clutch 9 is cup-shaped, with a bore in the center to admit a cylindrical stem forming part of the driven clutch member. In this case, as in that of Figs. 1 and 2, there are two air-gaps; but by reason of the penetration of one of the clutch members within the opening formed in the stationary member it will be seen that in moving apart or together to vary the clutching relation of the two members the gap at the stationary member remains undisturbed. The worm-shaft is given sufficient play to permit the motion to separate the clutch parts to take place on the member 6<sup>a</sup>.

What I claim as new, and desire to secure by Letters Patent of the United States, is—

1. A magnetic clutch comprising two rotary clutch members arranged to be brought into frictional engagement with each other, a stationary member of magnetic material forming part of the same magnetic circuit as the rotary clutch members, and an exciting-coil carried by the stationary member.

2. A friction-clutch comprising a stationary clutch member, a coil carried thereby, two rotary clutch members, one of which is movable axially to bring it into clutching relation, and a circuit of magnetic material including the stationary and rotary clutch members.

3. A magnetic clutch comprising two rotary clutch members provided with a detachable friction-shoe, one of said members being movable axially to effect a clutched or unclutched relation, a stationary member forming part of the same magnetic circuit as the rotary members and having a recess therein, and a coil anchored in the recess.

4. A magnetic clutch comprising two clutch members of magnetic material secured respectively to the driving and driven machine elements and movable relatively to bring them into frictional engagement, a stationary member of magnetic material supported between the two, and an exciting-coil to establish a magnetic flux through the movable and stationary members.

5. A magnetic clutch comprising two clutch members of magnetic material secured respectively to the driving and driven machine elements and movable relatively to bring them into frictional engagement, a stationary member of magnetic material supported between the two, and an exciting-coil to establish a magnetic flux through the movable and stationary members, the several members being so related that in all positions of the clutch a clearance-space exists between the stationary and the movable elements of the clutch.

6. A magnetic clutch comprising two clutch members attached respectively to the driving and driven machine elements and movable relatively to bring them into frictional engagement, a stationary clutch member having a recess therein, an exciting-coil in said recess, and a retaining device for the coil.

7. A magnetic clutch comprising a stationary member, two movable members attached respectively to the driving and driven elements and arranged to be brought into frictional engagement with each other, and a magnetic circuit including the three parts, the parts being so related that a uniform air-gap is provided between the stationary and movable members in all positions of clutch operation.

8. A magnetic clutch comprising a stationary member of iron carrying a polarizing-coil, two rotary clutch members, one attached to the driving and the other to the driven machine element, one of said rotary members being movable axially and penetrating an annular opening in the stationary member whereby a uniform air-gap is maintained at that point in all positions of the axial movement of said member.

In witness whereof I have hereunto set my hand this 16th day of June, 1902.

EDWARD M. HEWLETT.

Witnesses:
BENJAMIN B. HULL,
HELEN ORFORD.